United States Patent [19]
Rodrigues

[11] Patent Number: 5,979,328
[45] Date of Patent: Nov. 9, 1999

[54] VEHICULAR IMPACT SIGNALING DEVICE

[76] Inventor: Harry Rudolph Rodrigues, 18 Sea Way, San Rafael, Calif. 94901

[21] Appl. No.: 09/042,362

[22] Filed: Mar. 13, 1998

[51] Int. Cl.[6] .................................................... F42B 30/00
[52] U.S. Cl. .......................... 102/342; 102/345; 102/351; 102/361
[58] Field of Search .................................. 102/336, 342, 102/345, 346, 350, 351, 361; 280/734, 735; 180/274

[56] References Cited

U.S. PATENT DOCUMENTS

| | | | |
|---|---|---|---|
| 1,043,228 | 11/1912 | Harrington et al. | 102/361 |
| 1,326,156 | 12/1919 | Elia | 102/341 |
| 2,532,901 | 12/1950 | Glynn | 102/361 X |
| 2,961,962 | 11/1960 | Jackson | 102/336 |
| 3,036,451 | 5/1962 | Miller | 102/336 |
| 3,468,392 | 9/1969 | Haas | 280/735 X |
| 3,690,695 | 9/1972 | Jones, Sr. | 280/150 AB |
| 3,753,576 | 8/1973 | Gorman | 280/150 AB |
| 3,762,761 | 10/1973 | Erickson | 296/107 |
| 4,279,433 | 7/1981 | Petaja | 280/605 |
| 4,346,914 | 8/1982 | Livers et al. | 280/735 |
| 5,007,661 | 4/1991 | Lenzen | 102/275.8 |
| 5,187,382 | 2/1993 | Kondo | 307/10.1 |
| 5,394,142 | 2/1995 | Dusart | 280/735 X |
| 5,709,403 | 1/1998 | Taguchi et al. | |

*Primary Examiner*—Peter A. Nelson
*Attorney, Agent, or Firm*—Risto A. Rinne, Jr.

[57] ABSTRACT

An apparatus for the deployment of a visible plume to alert other motorists that a proximate motor vehicle has been involved in a collision is described as having a tube which is open at one end disposed at the top and closed at a distal end. The distal end houses an activation device that is used to detonate an explosive charge in response to the detection of an output signal. The output signal is generated by a sensor subsequent to the motor vehicle experiencing an impact of sufficient magnitude. Both the sensor and the output signal are compatible with current technologies used to detect impacts which result in the deployment of air bags, and accordingly the device may rely upon these systems as may already be installed in the motor vehicle. The explosive charge expels a signaling media above the motor vehicle in a plume above the motor vehicle to visually alert other motorists that a collision has occurred. The plume rises to a preferred height of approximately 60 feet, making it readily visible to the other motorists in the area. The signaling media includes a powder, liquid, or pyrotechnic device. The pyrotechnic device produces a momentary highly visible flare. An audible signal is generated by incorporating an explosive pyrotechnic device, such as a firecracker, within the signaling media.

16 Claims, 1 Drawing Sheet

VEHICULAR IMPACT SIGNALING DEVICE

BACKGROUND OF THE INVENTION

1. Field of the Invention

The present invention, in general relates to automobile safety accessories and, more particularly, to devices that produce a signal in response to a vehicular impact.

Unfortunately, vehicles do occasionally collide with each other and sometimes, as a result, inflict property damage as well as personal injury. Sometimes, an accident happens so quickly that a motorist who is traveling behind a vehicle that is involved in a collision is unable to stop in time, and so he also become involved in the accident, colliding into the vehicle in front.

Environmental conditions, such as rain or snow which contribute to both poor visibility and slippery road surfaces or fog can, at times, greatly increase the likelihood as well as exacerbate the magnitude of such occurrences.

These types of collisions are commonly called either "chain" collisions, or "chain reactions". They usually begin when a first forward vehicle is itself involved in an initial collision of some sort. Then another motorist, following behind, fails to stop in time and so his vehicle impacts with the "rear-end" of the first vehicle.

Most typically, this happens on the highway though sometimes it occurs even on rural roads. High driving speeds combined with dense traffic patterns favor the occurrence of such rear-end types of collisions. Poor visibility or slippery road surfaces only compound the problem.

The initial collision may involve the first vehicle impacting with another vehicle or some object. This sets up the initial starting condition of having the first forward vehicle involved in a collision. The first vehicle will most likely immediately come to a stop or it may remain moving but be dramatically slowed in speed as a result of the collision it just experienced.

The problem being addressed by the present disclosure appertains to preventing other vehicles following behind the first vehicle that has already been involved in a collision from also impacting with the first vehicle. Clearly this would be of benefit to all concerned. The first vehicle will then be spared from incurring additional vehicular damage that would otherwise result from being "rear-ended" by the following vehicle. The occupants of the first vehicle would also be spared from the risk of suffering further personal injury as a consequence of a subsequent additional rear-end type of an impact.

Sometimes, chain reaction collisions may involve a great many vehicles, each following behind another vehicle that is itself involved in a collision with a vehicle in front. This type of series of collisions can occur in rapid succession and may even involve hundreds of vehicles at a time along a particular stretch of highway when conditions happen to especially favor such tragic events.

The basic contributory cause behind such types of accidents is human reaction time. It takes time for people to realize that an accident has occurred and to then react by braking. Numerous studies have been undertaken which corroborate this essential aspect of driving. That is why student drivers are taught not to follow too closely behind the vehicle in front so as to allow time to react to such contingencies as when a vehicle in front is suddenly involved in an accident. Even though drivers are, in general, educated in this regard many do not practice what they have learned.

Another impediment to avoiding the occurrence of such types of multiple collisions is that drivers are apt to misinterpret what has happened. A driver following behind another vehicle may hear a sound and not know that it is the sound of the vehicle in front being involved in a collision. Neither may he be able to perceive or correctly interpret the changes in the path followed or the sudden speed reduction exhibited by the vehicle in front after it has been involved in a collision. Therefore the decision to brake may be delayed until it is too late and the following vehicle may also collide with the vehicle in front.

Accordingly there exists today a need for a device which can help to prevent such types of chain reaction collisions from occurring. Clearly, such an apparatus is an especially useful and desirable device.

2. Description of Prior Art

Signaling devices are, in general, known. For example, the following patents describe various types of these devices:

U.S. Pat. No. 1,855,956 to Gibbs, Apr. 26, 1932;

U.S. Pat. No. 2,646,016 to Wilson, Jul. 21, 1953;

U.S. Pat. No. 3,810,092 to Tucker, May 7, 1974;

U.S. Pat. No. 4,161,228 to Svensson et al, Jul. 17, 1979;

U.S. Pat. No. 4,381,829 to Montaron, May 3, 1983;

U.S. Pat. No. 5,301,990 to Willeford, Apr. 12, 1994;

U.S. Pat. No. 5,408,214 to Chalmers et al, Apr. 18, 1995; and

U.S. Pat. No. 5,611,567 to Hoo, Mar. 18, 1997.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a vehicular impact signaling device for use with a motor vehicle.

It is also an important object of the invention to provide a vehicular impact signaling device that can alert drivers that another vehicle has experienced a collision.

Another object of the invention is to provide a vehicular impact signaling device that is unobtrusive when installed in a motor vehicle.

Still another object of the invention is to provide a vehicular impact signaling device that is disposable after use.

Still yet another object of the invention is to provide a vehicular impact signaling device that can be activated by the same signal that is used to deploy an air bag in a motor vehicle during a collision.

Yet another important object of the invention is to provide a vehicular impact signaling device that is reliable.

Still yet another important object of the invention is to provide a vehicular impact signaling device that is inexpensive to manufacture.

Still yet an especially important object of the invention to provide a vehicular impact signaling device that produces a visible indication to warn other motorists that a motor vehicle has been involved in a collision.

Still yet a further especially important object of the invention to provide a vehicular impact signaling device that produces an audible indication to warn other motorists that a motor vehicle has been involved in a collision.

Briefly, a vehicular impact signaling device for use with a motor vehicle that is constructed in accordance with the principles of the present invention has a container that is preferably in the shape of a cylindrical tube. An activation device is contained in the bottom of the tube and is used to detonate an explosive charge upon detection of an output signal. The output signal is energized by a sensor which, as a result of a collision, supplies the output signal to the activation device. The explosive charge, once detonated, expels a signaling media through a frangible membrane out of the top of the tube and into the air above the motor vehicle where it can be perceived by other motorists. The signaling media includes colored powders, liquids, pyrotechnic displays, or audible devices to aid other motorists in making their determination that the motor vehicle has been involved in an impact.

DETAILED DESCRIPTION OF THE INVENTION

Figure 1:
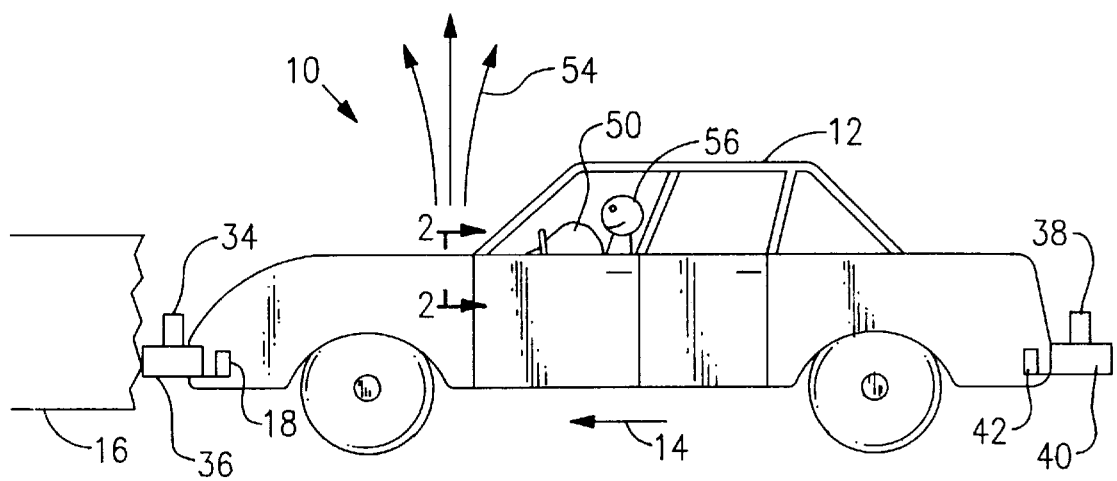
FIG. 1 is a side view of a vehicular impact signaling device being deployed from a motor vehicle subsequent to an impact.
Figure 2:
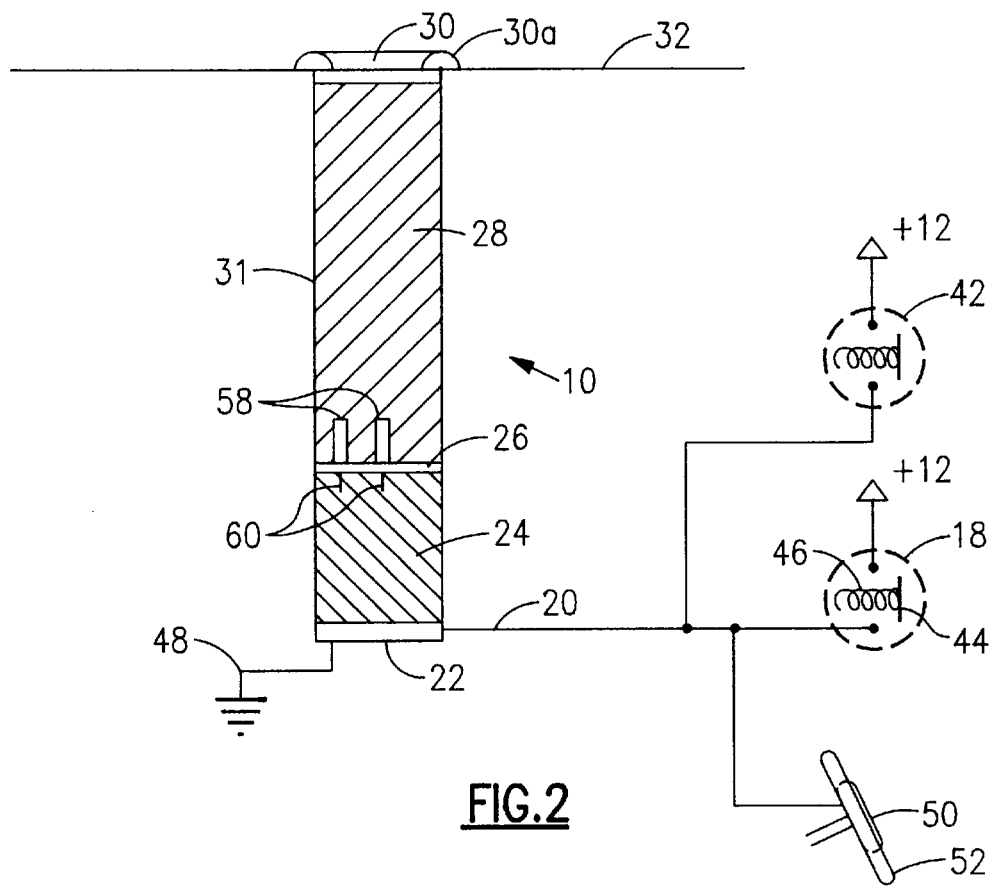
FIG. 2 is a cross sectional view taken on the line 2—2 in FIG. 1 of a vehicular impact signaling device prior to its deployment. It also includes, not part of the view taken on the line 2—2, a detail of a possible sensor and a schematic representation of the electrical connections between the sensor and the device. An air bag is also shown to illustrate a possible dual usage capability of the sensor.

Referring on occasion to both FIG. 1 and FIG. 2 is shown, a vehicular impact signaling device, identified in general by the reference numeral 10. The device 10 is shown intact in FIG. 2 and in the act of being deployed subsequent to a collision in FIG. 1.

A motor vehicle 12 is shown traveling in the direction of an arrow 14 and has just collided with an object 16. The object 16 is either another vehicle or a stationary structure. It could even be a moving object of some sort, like a trailer that has first disconnected from another vehicle and has then rolled into the motor vehicle 12.

A first sensor 18 is mounted where desired proximate the front of the motor vehicle 12. The first sensor 18, in response to a collision, creates an output signal 20 (FIG. 2). The output signal 20 is directed (electrically connected) to an activation unit 22 that is attached to the device 10.

The activation unit 22 is similar to that which is used, for example, to detonate the powder charge in an airbag 23. The activation unit 22 ignites an explosive charge 24 upon detection of the output signal 20. The activation unit 22 provides a trigger that instantly activates the explosive charge 24 when the output signal 20 occurs, as is discussed in greater detail hereinafter.

A first membrane 26 provides a seal between the explosive charge 24 and a signaling media 28. A second frangible membrane 30 is disposed on the device 10 at a distal end with respect to the activation unit 22. A cylindrical tube 31 is used to house the component parts, as hereinabove described, of the device 10.

The tube 31 is enclosed (sealed) at the end proximate the activation unit 22 and it includes an opening at the end proximate the frangible membrane 30 to ensure that, when activated, the signaling media 28 is expelled in the preferred direction which is through the opening and the frangible membrane 30.

The device 10 is installed in the motor vehicle 12 so that the frangible membrane 30 provides a surface that is congruent (flush) with a surface 32 of the motor vehicle 12. The installation of the device is optimized for aesthetic purposes as desired. To further the aesthetics of installation, the frangible member 30 includes a chrome plated ring 30a disposed adjacent thereto to provide a neat-finished look.

The main purpose of the frangible membrane 30 is to provide both a cover over the opening of the tube 31 and an environmental seal to protect the component parts of the device 10 from degradation, such as would occur if rain were allowed to penetrate into the cylindrical tube 31. Upon deployment, as is discussed in greater detail hereinbelow, the frangible membrane is destroyed. It can be constructed out of any preferred material including, but not limited to, rubber, elastomers, plastics, or the like.

The preferred location for the device 10 is generally on as shown in FIG. 1. The surface 32 of the vehicle is disposed on an upper portion of the passenger side quarter panel (not shown) at a location where a radio antenna (not shown) could be installed.

The exact location is variable to some degree. For example it could be disposed behind the occupant compartment of the motor vehicle 12 adjacent to a trunk. Other possible locations are discussed hereinafter. The device 10 must have direct access (line of sight) to an area above the motor vehicle 12. Accordingly, it could be disposed in a window or a door pillar pointing generally upward, if preferred.

The device 10 should be protected from harm during a collision. If the device 10 itself were destroyed upon impact then, obviously, it could not function and would not be of benefit.

An alternative tactic to protecting the device 10 is to rely upon a plurality of them. For example, it is possible to mount a second device 34 on a front bumper 36 providing that it is also used in conjunction with the device 10 because the device 10 is disposed in an area that is less prone to damage than is the front bumper 36.

Alternatively, if a third device 38 is attached to a rear bumper 40 in lieu of the device 10, proper functioning is nevertheless ensured considering the great likelihood that a simultaneous front and rear-end collision will not occur, especially in such a manner as to render both the second device 34 and the third device 38 inoperative.

A second sensor 42, similar in construction and function to the first sensor 18, is disposed near the rear of the motor vehicle 12 and most likely on the rear bumper 40 and is used to detect an impact from the rear. The first sensor 18 and the second sensor 42 each produce upon the detection of a sufficient impact, the output signal 20.

The output signal 20 of each sensor is wired together (in parallel) to form a logical "or" connection. Therefore a positive activation of the output signal 20 from either the first sensor 18 or from the second sensor 42 will trigger the activation device 22 to respond.

Referring momentarily to FIG. 2, the first sensor 18 includes a normally off electrical switch 44 that is held positively in the "off" position by a spring 46. A first pole of the switch 44 is connected to a source of electrical power, typically to a "plus twelve volt direct current" source, as is common in the motor vehicle 12. The first pole is normally insulated from the second pole which forms the output signal 20 to the activation device 22.

Upon the detection of an impact the switch 44 contacts close and the source of electrical power is connected to the output signal 20. Standard electrical "decoupling" techniques are well known in the arts to prevent spurious electrical noises from inadvertently causing deployment and are, therefore, not shown. For example, a capacitor (not shown) may be disposed intermediate the output signal 20 and an electrical ground 48 to attenuate certain types of electrical noise and interference.

This is especially useful if the motor vehicle 12 includes a microcomputer system (not shown) that monitors the status, including possible impacts, of the motor vehicle 12. The microcomputer system would then have the responsibility of ultimately generating a verified output signal (not shown) in response to making a determination that an impact of sufficient magnitude has occurred.

The verified output signal would, like the output signal 20, be used to trigger the activation of the device 10 and quite likely other vehicle safety types of devices (Not shown. However one such type of safety device, an air bag is discussed in greater detail hereinafter), as well.

The activation unit 22 is electrically connected to the electrical ground 48 which then completes the electrical circuit and allows the activation unit 22 to detonate the explosive charge 24 in response to the activation of the output signal 20. The second sensor 42, being of similar construction and wired in parallel with the first sensor 18, would similarly activate the output signal 20 if it were to detect a collision at the location where it is mounted.

An air bag 50 is shown in a cross sectional view of a steering wheel 52 of the motor vehicle 12 (FIG. 2). The output signal 20 is also used to deploy the air bag, in this case, in the event of either a front or rear collision.

If desired, the output of the second sensor 42 may be isolated from that of the first sensor 18 by electrical isolation techniques, such as installing a diode (not shown) intermediate the second pole of the second sensor 18 and the air bag 50, as is well known in the electrical arts. This would be utilized if it were desired to deploy the air bag 50 if the first sensor 18 detects an impact at the front of the motor vehicle 12 and not to deploy the air bag 50 if the second sensor 42 detects an impact at the rear of the motor vehicle 12.

The air bag 50 is presently installed on most of the motor vehicles 12 produced. As desired, the technology used in the construction of the activation unit 22 of the device 10 is copied from the various prior art references which appertain to the activation of air bags, in general. Therefore, being compatible with activation of the air bag 50, the output signal 20 as relied upon by the device 10 is compatible with that used by the air bag 50.

This compatibility with the air bag 50 makes installation of the device 10 more convenient and less expensive because the first sensor 18 is the same as may presently used with the air bag 50 and therefore it would not have to be added to the motor vehicle 12 if the motor vehicle 12 is already equipped with the air bag 50 that is functional. The output signal 20 that is already coupled to the air bag 50 is then merely extended (wired) so as to also connect with the device 10.

If desired, the second sensor 42 is also added and wired as was described hereinabove, to provide detection of rear impacts. Of course, a plurality of sensors (not shown) may be added wherever desired to detect impacts at other locations of the motor vehicle 12. Any of these detected impacts may then be utilized to deploy the device 10 if of sufficient magnitude.

The first membrane 26 provides a seal between the explosive charge 24 and the signaling media that prevents mingling of these components. The signaling media 28 includes any powder or liquid or pyrotechnic substance or combination thereof that produces a plume 54 when expelled from the device 10. To augment visibility the powder, liquid, or pyrotechnic substance may include a colored pigment.

The pyrotechnic substance ignited upon deployment and so acts as a flare to produce a momentary, but especially bright source of illumination that is especially visible to other motorists when poor visibility conditions prevail, such as fog, rain, or snow.

The first membrane 26 may be omitted, if desired, when the signaling media 28 includes a pyrotechnic substance that requires ignition by the explosive charge 24 and there is no danger of detrimental mingling between the signaling media 28 and the explosive charge 24.

When an impact of sufficient predetermined magnitude occurs at the front of the motor vehicle 12, the switch 44 of the first sensor 18 closes which activates the output signal 20. The output signal 20 causes the activation unit 22 to respond and ignite the explosive charge 24 which, in turn, expels the signaling media 28 out of the tube 31 while destroying the frangible membrane 30.

The signaling media 28 forms the plume 54 as it is expelled that reaches, ideally from 50 to 60 feet high, which other motorists (not shown) can readily see. The other motorists immediately begin to decelerate (brake) their own vehicles (not shown) in response thereto.

The device 10 thus provides them with a clear and definitive indication that an accident has occurred and saves them from the errors of their own perceptions and interpretations. Accordingly, reaction time is improved and the likelihood of additional accidents is lessened.

The plume 54 will not likely be visible to a driver 56 in the motor vehicle 12 during deployment as it happens too fast for the driver 56 to perceive. In addition, his attention will surely be focused on the object 16 which has just been struck by the motor vehicle 12. Also, any sound associated with its deployment will likely go unnoticed by the driver 56, being muffled by the sound of the impact itself.

FIG. 2 shows the air bag 50 also being deployed simultaneous with the device 10. The device 10 is used one time and is either refilled (by a qualified technician, not shown) or is simply and preferably replaced with a new device 10, as is the air bag 50. The device 10 is intended to be a single use device, yet allowances are made which anticipate the likelihood that human ingenuity will find a way to refill the device 10.

The methods used to deploy the signaling media 28 are consistent with improvements made to the deployment methods as are used to deploy the air bag 50. The explosive charge 24 can be replaced by the sudden release of a compressed gas, for example.

Also, the activation unit 22 is anticipated to make reliance upon all known methods of triggering (igniting) the explosive charge 24. For example the activation of the output signal 20 completes an electrical circuit which the activation unit 22 then utilizes in the preferred manner. The current flow may be utilized by the activation unit 22 to initiate a rapid exothermic reaction producing sufficient heat energy to ignite the explosive charge 24. Alternatively, a solenoid (not shown) may be energized which, as it moves, acts as a firing pin to detonate an impact actuated priming device, such as is well known in explosive and gun powder arts.

If it is desirable to provide an audible indication to other motorists that a collision has occurred, at least one "firecracker" 58 is installed in the tube 31 preferably adjacent to the first membrane 26 in such manner as to have a fuse 60 of the firecracker 58 pass through the first membrane 26 and be exposed to the explosive charge 24 so that the fuse 60 is essentially consumed during deployment which then allows the firecracker 58 to detonate immediately after its deployment, thus providing a timely audible indication that a collision has occurred.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A vehicular signaling device for use with a motor vehicle, comprising:
   (a) container means that includes an open end at the top and a closed distal end;
   (b) activation means disposed in said container means proximate said distal end:
   (c) propellant means disposed in said container means proximate said activation means; and
   (d) signaling means wherein said signaling means is a liquid, a powder, a pyrotechnic device, a source of visible light, or means for producing an audible sound disposed in said container proximate said propellant means,
   wherein said propellant means is adapted to expel said signaling means from said open end to a predetermined elevation above said motor vehicle in response to an operation by said activation means, said signaling means being actuated after being expelled from said container means.

2. The vehicular signaling device of claim 1 wherein said container means includes a cylindrical tube.

3. The vehicular signaling device of claim 1 wherein said propellant means includes explosive means.

4. The vehicular signaling device of claim 1 wherein said open end includes frangible means disposed over said open end.

5. The vehicular signaling device of claim 4 wherein said frangible means includes means for providing a seal for said open end.

6. The vehicular signaling device of claim 1 including a membrane disposed intermediate said propellant means and said signaling means.

7. The vehicular signaling device of claim 1 including an electrical ground and wherein a predetermined condition that results in the operation of said activation means includes an electrical signal supplied to said device in response to an impact by said motor vehicle which completes an electrical circuit.

8. The vehicular signaling device of claim 1 wherein said source of visible light includes means for producing illumination.

9. The vehicular signaling means of claim 1 wherein said means for producing an audible sound includes at least one firecracker.

10. The vehicular signaling device of claim 1 wherein a predetermined condition that results in the actuation of said activation means includes an electrical signal supplied to said device.

11. The vehicular signaling device of claim 10 wherein said electrical signal is generated by means for sensing an impact.

12. The vehicular signaling device of claim 11 wherein said electrical signal is compatible with a signal used to deploy an airbag.

13. The vehicular signaling device of claim 11 wherein said means for sensing includes a plurality of means for sensing, each of said plurality of means for sensing being electrically connected in parallel.

14. The vehicular signaling device of claim 1 wherein a predetermined condition that results in the operation of said activation means includes an electrical signal supplied to said activation means and wherein said propellant means includes explosive means and wherein said activation means is adapted to ignite said explosive means in response to an electrical signal supplied to said device and wherein said electrical signal is generated by means for sensing an impact.

15. The vehicular signaling device of claim 1 wherein said signaling means includes a plurality of signaling devices.

16. The vehicular signaling device of claim 1 wherein a predetermined condition that results in the operation of said activation means is an impact sustained by said motor vehicle.

* * * * *